Oct. 2, 1956  J. M. BOURGUET ET AL  2,765,265
METHOD AND APPARATUS FOR PNEUMATICALLY LIFTING
GRANULAR CONTACT MATERIAL
Filed Dec. 4, 1951

INVENTORS
Frederick E. Ray
BY Jean M. Bourguet

Charles A. Huggett
AGENT

United States Patent Office 2,765,265
Patented Oct. 2, 1956

2,765,265

METHOD AND APPARATUS FOR PNEUMATICALLY LIFTING GRANULAR CONTACT MATERIAL

Jean M. Bourguet, Westville, and Frederick E. Ray, Woodbury, N. J., assignors to Socony Mobil Oil Company, Inc., a corporation of New York Application December 4, 1951, Serial No. 259,742

9 Claims. (Cl. 196—52)

This invention deals with an improved method and apparatus for pneumatic transfer of granular contact materials from a given location to a higher location. It is particularly concerned with improvement in the engagement of lift gas with the solids at the bottom of a pneumatic lift useful in cyclic hydrocarbon conversion systems of the moving bed type.

The invention may be applied to such processes as catalytic cracking, isomerization, hydrogenation, dehydrogenation, reforming, hydroforming, aromatization, alkylation, cyclicizing, treating and desulfurization of petroleum fractions. Also, the invention may be applied to coking of hydrocarbons in the presence of granular coke or refractory solids, viscosity reducing of petroleum residuums at elevated temperatures, pyrolytic conversion processes such as the conversion of propane and ethane to unsaturated hydrocarbons and of methane to acetylene.

The contact material involved may vary widely in its properties depending upon its use. For catalytic hydrocarbon systems the catalyst may take the form of natural or treated clays, bauxites, inert or active carriers impregnated with certain catalytically active metals or compounds thereof, or synthetic associations of silica, alumina, magnesia, chromia, molybdenum oxide, etc., or combinations thereof to which may be added small amounts of other compounds, usually metallic compounds for specific purposes. When the contact material is employed principally for heat carrying purposes as in pyrolytic conversion processes it may take the form of any of a number of refractory materials such as fused alumina, mullite, carborundum zirconium oxide, charcoal, etc., for coking processes the solid material may comprise of a low activity clay catalyst, petroleum coke, pumice or similar materials. The contact material may be in the form of pellets, spheres, tablets, pills or irregular shaped material of palpable particulate form as distinguished from powdered material. It should be understood that the term "granular" as employed herein in describing and claiming this invention is intended to broadly cover any of the above forms of contact material. The contact material involved in this invention may range in size from about 0.005 to 0.5 inch and preferably from about 4–20 mesh by Tyler Standard Screen Analysis. The density of the material as poured into a measuring container may be within the range about 20–130 pounds per cubic foot, and in the case of adsorbents preferably within the range about 25–60 pounds per cubic foot.

In continuous catalytic cracking systems the contact material is passed cyclically through a conversion zone wherein it contacts a hydrocarbon feed at pressures usually above atmospheric and temperatures of the order of 700–1100° F. whereby the feed is converted and then through a regeneration zone wherein a carbonaceous contaminant deposited on the catalyst in the conversion zone is removed by burning. When the granular catalysts are employed it has been found to be highly desirable to maintain the catalyst as a substantially compact bed or column of gravitating particles in the conversion and regeneration zones. Until recently, continuous bucket elevators were employed exclusively to effect transfer of the catalyst between zones in commercial units. Mechanical elevators have been found to impose certain practical limitations on the overall unit height and on the amount of catalyst circulated. As a result, heretofore all commercial continuous catalytic cracking units of the compact moving bed type have involved side by side arrangement of reactor and kiln thereby requiring two elevators and have involved relatively low catalyst circulation rates. It has been found desirable to increase catalyst circulation rates in order to permit simplification of other parts of the system, particularly the kiln and to arrange the reactor and kiln in vertical series so as to require only a single catalyst transfer step per cycle. This could not be done practically with existing mechanical transfer devices. It had been proposed from time to time to effect the catalyst transfer by pneumatic catalyst transfer lifts but the use of pneumatic transfer in these cyclic conversion systems was prevented because of the very high catalyst attrition and breakage encountered in the pneumatic transfer step, and further because of excessive power requirements. Pneumatic lifts have been developed recently which provide practical pneumatic transfer of the granular contact material in these cyclic conversion systems, in part by delicate control of the gas velocities at various points along the lift. The lifts are disclosed in application for United States Patent Serial Number 210,942, filed February 14, 1951. These lifts involve essentially the use of a continuous vertical lift passage, open at both ends, and with the ends projected into feeding and receiving zones, terminated intermediate the top and bottom of each zone. Contact material is gravitated into the feeding zone at the bottom of the lift as a substantially compact mass and travels downwardly about the lower end of the lift passage. A pneumatic transfer gas is introduced into the zone in two streams, a primary and secondary stream. The primary stream is introduced from a point near the bottom of the lift so as to enter the lift without passing through the mass of compacted material, usually directly beneath the lift. The secondary stream is introduced at one or more locations laterally displaced from the centerline of the lift so that it passes through a substantial thickness of the contact material in the feeding zone.

It has been discovered that where the horizontal cross-section of these lifts is reasonably large, a substantial amount of attrition occurs, particularly in the lower region of the lift passage. The purpose of this invention is to provide method and means of mixing the primary gas more uniformly with the contact material to reduce attrition of the contact material in the lift.

It is an object of this invention to provide an improved method and means for lifting contact material pneumatically which provides an effective reduction in the attrition of the contact material.

It is a further object of this invention to provide an improved method and apparatus for mixing lift gas with solid contact material in pneumatic lifts used to raise contact material in cyclic hydrocarbon conversion systems.

These and other objects of the invention will become apparent from the following description of the invention, to be read in conjunction with the referenced sketches.

Figure 4 is an elevational view of the primary gas pipe screen.

Figure 1:
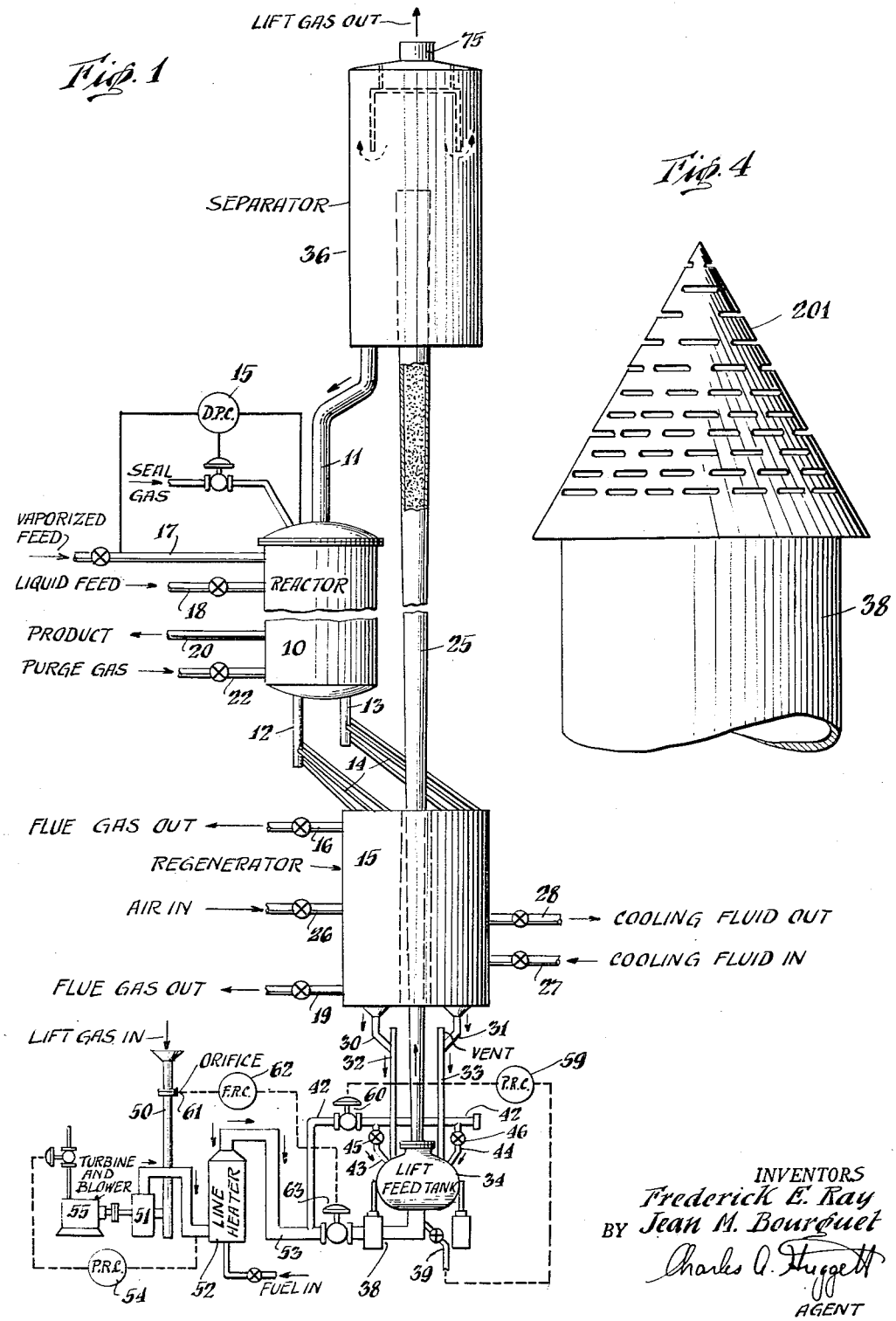
Figure 1 is an elevational view, partially in section, of a preferred arrangement and application of this invention.
Figure 2:
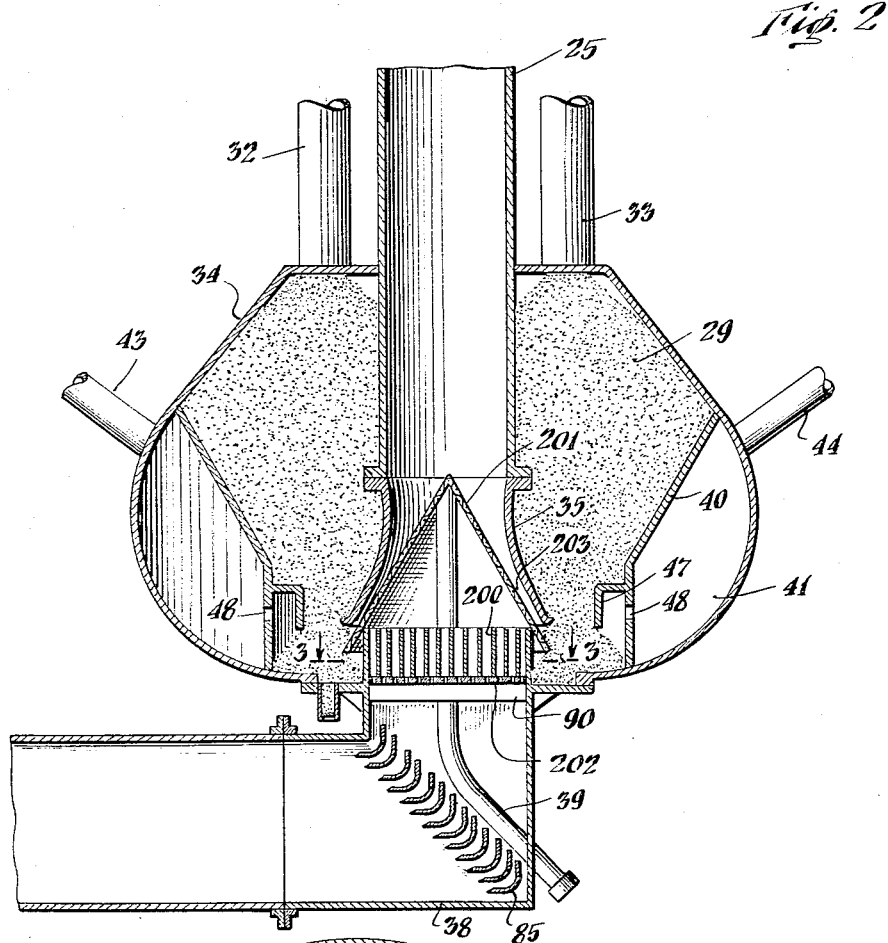
Figure 2 is an elevational view, partially in section, of the lower portion of the pneumatic lift of Figure 1.

Turning now to Figures 1 and 2, there is shown a typical application of this invention in a cyclic continuous moving bed catalytic cracking process. In the drawing there is shown a reactor 10 which is adapted to confine a moving compact bed of catalyst and which internally may incorporate those features by now well known to the art for accomplishing uniform flow, contacting, engaging and disengaging of the catalyst and reactant. Catalyst enters the reactor through a gravity feed leg 11, which may be of the type disclosed and claimed in United States Patent Number 2,410,309, and catalyst is withdrawn from the reactor via two or more conduits 12 and 13 from which it flows through branch conduits 14 to the upper end of a catalyst regenerator 15. The withdrawal system may be similar to that now disclosed and claimed in application Serial Number 132,067, filed in the United States Patent Office on December 9, 1949, now U. S. Patent 2,536,625. Vaporized hydrocarbon feed, for example, a 500–900° F. gas oil cut, may enter the upper section of the reactor via pipe 17. The feed may be preheated in a heater not shown to a temperature of the order of 700–900° F. A suitable high boiling liquid hydrocarbon feed may be supplied into the reactor via pipe 18, either cold or in preheated conditions. The internal liquid feed arrangement may be similar to that disclosed in application Serial Number 719,724, filed in the United States Patent Office on January 2, 1947, now U. S. Patent 2,574,850. The cracked lower boiling gaseous hydrocarbon products may be withdrawn from the lower section of the reactor via pipe 20. The internal arrangement associated with pipe 20 may be similar to that disclosed and claimed in United States Patents 2,458,498 and 2,459,096. A suitable inert seal gas such as steam or flue gas may be supplied to an upper seal zone in the reactor via pipe 21. The rate of seal gas supply is maintained by differential pressure controller 15 sufficient to control the pressure in the seal zone slightly above that in the reaction zone proper. Similarly, a seal and purge gas is admitted into the lower section of the reactor via pipe 22 to purge gaseous hydrocarbons from the effluent catalyst. It should be understood that the word "gaseous" as employed herein is intended in a broad sense as covering materials in the gaseous phase under the particular operating conditions involved regardless of what may be the phase of such materials under ordinary atmospheric conditions. The reactor may be operated at a pressure near or somewhat above or below that in the kiln. When the reactor pressure is substantially above that in the kiln it may be desirable to provide a depressurizing zone in the legs 12 and 13.

While the invention is not limited thereto the kiln shown is of annular shape so as to provide a central shaft through which a lift conduit 25 extends. The kiln 15 is provided with a central air inlet 26 and flue gas outlets 16 and 19 adjacent either end. A bank of cooling tubes is provided in the lower section of the kiln supplied with a suitable cooling liquid or gas via pipe 27. Cooling fluid leaves these tubes via pipe 28. Suitable internal arrangements for the kiln here shown are disclosed and claimed in application Serial Number 186,953, filed in the United States Patent Office September 27, 1950, now U. S. Patent 2,695,220 and Serial Number 186,954, filed in the United States Patent Office September 27, 1950.

The catalyst passes from kiln 15 via two or more pipes 30 and 31 as compact streams delivering onto compact gravity feed legs in pipes 32 and 33 respectively. These legs are vented to the atmosphere on their upper ends, and suitable flow measuring devices may be provided in association therewith.

The catalyst delivers from legs 32 and 33 onto a bed 29 thereof in a lift feed tank 34. A substantially vertical tapered lift pipe 25 extends upwardly from a location under the surface of the bed 29 and intermediate the ends of tank 34 to a location within and intermediate the ends of a combination settling-surge vessel 36 which is positioned a substantial distance above the reactor 10. The lower end of the lift pipe may be flared outwardly to form a mouthpiece 35. This mouthpiece is preferably flared outwardly along a curve, approximately a hyperbolic spiral. A detailed view of this mouthpiece is shown on Figure 2. The mouthpiece 35 may be a separate member which is attached to a vertical member to form the assembled lift pipe or may be merely the lower end of a continuous pipe. When the expression "lift passage" is used herein it is meant to include the entire passage from top to bottom including generally a vertical portion and also in preferable designs the curved inlet portion in addition to the vertical portion. The primary gas is introduced directly into the lower end of the lift passage and the catalyst is forced to separately enter the lower end of the passage and mix with the primary lift gas. Preferably the contact material is suspended upwardly from a level below or at least not above the level of primary gas entry. It is also preferred that the mixing of the contact material and primary gas occur below the vertical portion of the lift passage.

A conduit 38 having, if desired, a perforated conical roof 201 located directly below and preferably at least partly within the flared mouthpiece 35 is provided for introduction of primary lift gas substantially directly into the lift passage without the necessity of its flow through any substantial portion of the bed 29. In arrangements of the type described the width of the annular passage 203 between the mouthpiece 35 and gas inlet distributor cone 201 will vary depending upon the dimensions of the lift pipe. As an example, for a 20" diameter lift pipe, 200 feet high, the width of the annular passage 203 was about 3½ inches. Broadly the width of this passage may range from about 1½ inches to 4 inches with the gas velocity in this region being controlled between about 10 to 100 ft. per sec. Conduit 39 is a catalyst drain employed only when the unit is shut down. A ring partition 40 is arranged within the feed tank to provide an annular secondary gas plenum chamber 41. Secondary gas is supplied this plenum chamber via pipes 43 and 44. A downwardly facing ring type angle baffle 47 is provided to form a means for distributing secondary gas into the bed 29. Orifices 48 communicate the plenum chamber 41 with the space under baffle 47. The secondary gas in order to reach the lift passage must pass through a portion of the feed tank in which there exists a substantial thickness of compact catalyst mass or bed between the distributors 47 and the lower end of mouthpiece 35. The primary gas is introduced directly into the lower end of the lift passage and the catalyst is forced to separately enter the lower end of the passage and mix with the primary lift gas. Preferably the contact material is suspended upwardly from a level below or at least not above the level of primary gas entry. It is also preferred that the mixing of the contact material and primary gas occur below the vertical portion of the lift passage.

The rate of catalyst entry into the lift can be regulated by control of the rate of secondary gas flow and, that once this is set, the total gas velocity, catalyst velocity and stream density in the lift can be regulated by control of the primary air supply. This method of operation is broadly disclosed and claimed in application Serial Number 76,917, filed in the United States Patent Office February 12, 1949, now Patent 2,589,082. The lift gas, which may be air, steam or flue gas, for example, is drawn through conduit 50 into the blower by which it is forced through line burner 52 wherein it is heated and then via conduit 53 to supply manifolds 42 and 38. The pressure at the blower 51 is maintained constant by pressure regulating controller 54 which controls the speed of the turbine 55. Other things being equal the pressure at the inlet to the mouthpiece 35 will increase with increasing catalyst throughput rates. Hence by settling the pressure regulating controller 59 at a given pressure the rate of secondary air flow can be maintained substantially constant through actuation of control valve 60 by controller 59. The total rate of gas supply is maintained constant at any desired set value by means of orifice 61, flow regulating controller 62 and control valve 63. Once the controller 62 is set, an increase in secondary air flow is accompanied by an automatic equal decrease in primary air flow. If desired, the preheating of the lift gas may be omitted.

The lift pipe 25 shown is of tapered construction substantially along its entire length, having its greatest cross-section at its upper end. The catalyst separates from the gas in the surge-separation vessel 36 and the gas is withdrawn through the conduit 75. The catalyst settles on a bed in the bottom of the vessel and is withdrawn downwardly, in the form of a substantially compact stream, through the feed leg 11 to the reactor 10. Details of a suitable surge-separator, designed to minimize attrition during the settling of the catalyst and also provide a surge zone, are shown in application Serial Number 211,238, filed in the United States Patent Office on February 11, 1951.

It has been found that if the average gas and catalyst velocities in the pneumatic lift passage fall below a certain critical minimum which depends upon certain features of the lift pipe, the catalyst attrition rate will increase very rapidly for even small increments of gas and catalyst velocity decline. On the other hand when the gas and catalyst velocities exceed the critical velocities, the catalyst attrition rate gradually increases but at a substantially lower rate than below the minimum velocity. Details of the required gas and catalyst velocity control for efficient transfer of granular material with minimum attrition through substantially vertical passages are shown and claimed in application Serial Number 210,942, filed in the United States Patent Office on February 14, 1951. It is found that generally the gas and catalyst velocities in the lift passage must be reduced in the upper portion of the lift to prevent attrition in the upper portion of the lift and in the surge-separation zone. This can be accomplished by tapering the lift outwardly from bottom to top. In some instances, however, it is found unnecessary to taper the passage to obtain suitable velocity control. In other instances, velocity control can be obtained by withdrawing gas in controlled amounts at spaced levels along the lift.

It has been discovered that when the design details of a lift of small diameter are transferred to a lift of larger diameter, the attrition is higher than that theoretically calculated. This is believed to be caused, at least in part, by the irregularity of the primary gas velocity across the lower section of the lift passage caused by irregularity in the gas flow. This may cause the gas velocity at a particular location to be above or below the critical, although it is not intended that this invention be restricted to any particular theory. It has been discovered that when the primary gas stream is broken up into a multiplicity of small streams which are directed through passages running parallel to the centerline of the lift passage before being discharged into the lower end of the lift, a substantial reduction in attrition occurs, bringing the attrition in the lift more nearly in line with theoretical calculations.

Figure 3:
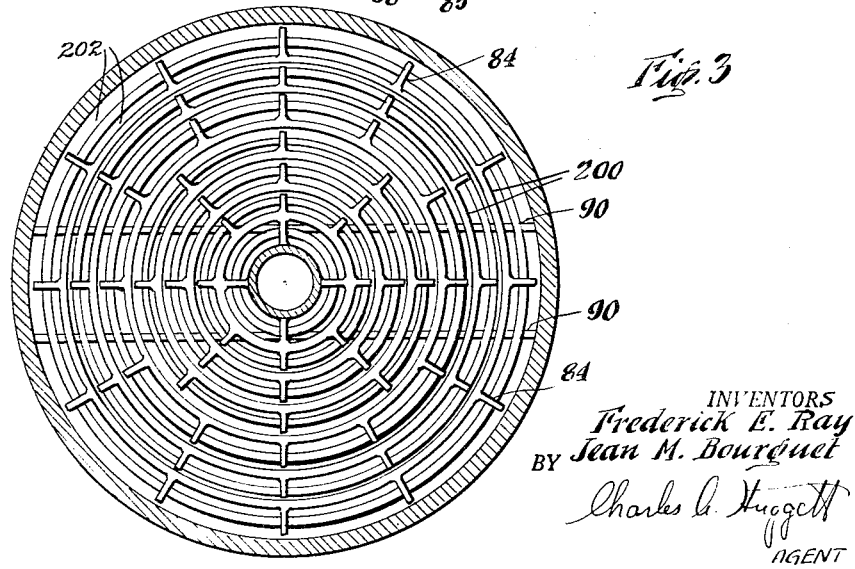
Figure 3 is a plan view of Figure 2 as seen on plane 3—3 of Figure 2.

In a preferred embodiment of this invention, shown on Figures 2 and 3, the horizontal conduit 38 makes a right angle bend beneath the lift pot 34 and discharges vertically upward beneath the lift pipe 25. A horizontal orifice plate 202 is located in the vertical section of the conduit 38 a substantial distance below the upper end of the conduit. The horizontal orifice plate may be made up, as shown in the figures, of a group of concentric annular rings of substantially equal width supported on orifice support bars 99. Cylindrical baffles 200 and radial straightening vanes 84 are arranged above the orifice plate 202. The radial straightening baffles are attached to the outside of each cylindrical baffle and have a nominal clearance between the inner wall of the next larger baffle. A conical screen is attached to the top of the conduit 38 with the apex projected into the mouth piece of the lift pipe. The screen has a skirt at its lower end which extends laterally outward about the conduit 38. A suitable apex angle for the screen is found to be in the neighborhood of 60-degrees. A multiplicity of curved directional baffles or vanes 85 are disposed horizontally in the gas conduit at the right angle bend. These baffles are substantially equally spaced to provide a multiplicity of gas passages. The baffles each have one edge horizontal and are curved to the vertical position at the other end. The horizontal edge of the baffles is tapered to a sharp edge. A possible form of screen is shown on Figure 4. The openings are slots arranged in horizontal rings about the surface of the screen on a multiplicity of levels.

*Example I*

A sector of a commercial lift was operated both with and without radial straightening vanes and cylindrical baffles. This lift utilized a tapered lift pipe having a lower frusto-conical portion extending 65% of the length from above the mouthpiece. The diameter of the lift passage was 25.65″, 27″, 29″, 31.7″ and 39.3″ at the bottom of the frusto-conical portion, 50 feet up, 100 feet up, 150 feet up and 237 feet up (upper end) respectively. The mean diameter was 30.9″. The primary and secondary gas feeding arrangement was similar to that shown on the attached figures. The following comparison was obtained:

|  | Without radial straightening vanes and cylindrical baffles | With radial straightening vanes and cylindrical baffles |
| --- | --- | --- |
| Circulation Rate | 340 tons/hour | 340 tons/hour. |
| Catalyst Attrition | 3.8 tons/day | 2.9 tons/day. |

The catalyst used was a synthetic silica-alumina gel prepared in the manner described in United States Patent Number 2,384,949, issued September 18, 1945. The particle diameter was 0.142 in. average size, and the bed density was 42 pounds per cubic foot settled density (i. e. density measured as poured into a receptacle without further packing). The catalyst used in both the above and the following examples was new catalyst and consequently the attrition rates were somewhat higher than would have been obtained with equilibrium catalyst which had become hardened by use and by removal of the weaker particles.

*Example II*

Using the same sector of the commercial lift described in Example I, the effect of operation with and without a screen on the end of the primary gas pipe was tested. The following results were obtained:

|  | With radial straightening vanes, cylindrical baffles | With radial straightening vanes, cylindrical baffles and screen |
| --- | --- | --- |
| Circulation Rate | 340 tons/hour | 340 tons/hour. |
| Catalyst Attrition | 9.3 tons/day | 2.9 tons/day. |

The catalyst was the same as used for Example I.

The screen may be fabricated of wire mesh for satisfactory primary gas distribution. In order to make it strong enough, however, it is preferred that a conical metal hood with holes drilled through the metal be used. The holes must be distributed uniformly over the surface of the hood to keep the particles away from the hood. Uneven distribution of the holes in the hood causes the catalyst to rub against the hood and erode the metal. In order to provide a strong hood for the primary gas pipe and sufficient area for gas flow, the holes are made substantially greater in size than the catalyst particles and a wire mesh screen is placed the hood. The screen has a mesh size small enough to prevent catalyst particles from dropping into the primary pipe.

As the secondary gas pushes catalyst into the lift pipe, the gas pressure in the region between the screen and the lower end of the lift pipe inlet, which may be conveniently referred to as the gap, becomes materially greater than the gas pressure in the center of the pipe. The pressure below the orifice plate must be substantially greater than the pressure in the gap to insure uniform distribution of the primary gas across the primary gas pipe. Unless there is a substantial pressure drop across the orifices, the gas tends to flow through the center passages of the primary gas pipe. For example, when the pressure in the gap between the screen and the lift pipe inlet is about 0.3 p. s. i. (gauge), the pressure drop across the orifice plate should be about 1 p. s. i. (gauge) for satisfactory distribution of the primary gas.

It is to be understood that the specific examples of apparatus, design and arrangement, and of operation and application of this invention are intended only as illustrative of the invention and it is intended to cover all changes and modifications of the examples herein chosen for purposes of disclosure, which do not constitute departure from the spirit and scope of the invention.

We claim:

1. In a cyclic hydrocarbon conversion process in which a granular contact material is gravitated downwardly as substantially compact columns through conversion and reconditioning zones and the granular material is lifted from a location beneath one of the zones to a location above the other zone through a substantially vertical elongated lift passage, the improved method of lifting the material without excessive attrition comprising: delivering a primary lift gas stream through a horizontal passage to a location beneath the lift passage, splitting the lift gas stream in said passage into a multiplicity of smaller streams and transferring these streams through curved paths to discharge in a verticaly upward direction into a vertical passage so as to change the direction of flow of the primary gas stream from horizontal to vertical, said vertical passage being substantially coaxial with the lift passage, splitting the lift gas into a multiplicity of streams of gas which are uniformly distributed across the vertical passage and throttling the gas flow through each stream substantially equal amounts, so as to effectively equalize the gas flow through each stream, passing the streams upwardly along paths substantially parallel to the centerline of the lift pasage, the cross-section of each stream being substantialy uniform during passage along the vertical paths and the cross-section of each being substantially smaller than the cross-section of the vertical passage, discharging the streams from the top of the vertical passage, delivering contact material onto a substantially compact bed about the bottom of the lift passage, delivering streams of secondary lift gas into the bed at locations distributed uniformly about the lower end of the lift passage and at a level below the upper end of the vertical passage, at a flow rate sufficient to effect transfer of contact material laterally into the lower end of the lift passage, mixing of the conical material with the primary lift gas in the lower end of the lift passage, and upward transfer of the suspended contact material through the lift passage.

2. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: a lift feed chamber located below one of said contacting chambers, conduit means for flow of contact material from said contacting chamber to the upper section of said feed chamber, a separation chamber having a gas outlet near its upper end postioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a flared mouthpiece forming the lower end of said lift conduit having its downwardly facing lower end open to the feed chamber at a location above the bottom of the chamber, a gas inlet conduit projected upwardly into said feeding chamber, being terminated near the bottom of the lift conduit, the gas inlet and lift conduits being substantially coaxial a multiplicity of concentric rings horizontaly located in said gas inlet conduit, disposed to define orifice passageways of annular cross-section between adjacent rings, a multiplicity of concentric cylindrical baffles located above the rings, and a multiplicity of radial straightening baffles vertically disposed between adjacent cylindrical baffles, uniformly arranged to split the annular passageways into a multiplicity of substantially equal smaller passageways.

3. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: a lift feed chamber located below one of said contacting chambers, conduit means for flow of contact material from said contacting chamber to the upper section of said feed chamber, a separation chamber having a gas outlet near its upper end positioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a flared mouthpiece forming the lower end of said lift conduit having its downwardly facing lower end open to the feed chamber at a location above the bottom of the chamber, a primary gas inlet conduit projected upwardly into said feeding chamber, being terminated near the bottom of the lift conduit, the upper end of the primary gas inlet conduit being substantially coaxial with the lift conduit, a multiplicity of concentric rings horizontally located in said primary gas inlet conduit, disposed to define orifice passageways of annular cross-section between adjacent rings, a multiplicity of concentric cylindrical baffles located above the rings, a multiplicity of radial straightening baffles vertically disposed between adjacent cylindrical baffles, uniformly arranged to split the annular passageways into a multiplicity of substantially equal smaller passageways, a ring partition arranged in the feed chamber to provide a secondary gas plenum chamber, said partition defining a multiplicity of orifices spaced about the lower end of the lift conduit, conduit means for supplying secondary lift gas to the plenum chamber, and a downwardly facing ring type angle baffle attached to the ring partition, so as to provide a means for distributing secondary gas into a bed of contact material in the lift chamber, the lower end of the baffle being below the upper end of the primary gas inlet conduit.

4. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: a lift feed chamber located below one of said contacting chambers, conduit means for flow of contact material from said contacting chamber to the upper section of said feed chamber, a separation chamber having a gas outlet near its upper end positioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a flared mouthpiece forming the lower end of said lift conduit having its downwardly facing lower end open to the feed chamber at a location above the bottom of the chamber, a primary gas inlet conduit projected upwardly into said feeding chamber, being terminated near the bottom of the lift conduit, the upper end of the primary gas inlet conduit being substantially coaxial with the lift conduit, a multiplicity of concentric rings horizontally located in said primary gas inlet conduit, disposed to define orifice passageways of annular cross-section between adjacent rings, a multiplicity of concentric cylindrical baffles located above the rings, a multiplicity of radial straightening baffles vertically disposed between adjacent cylindrical baffles, uniformly arranged to split the annular passageways into a multiplicity of substantially equal smaller passageways, a perforated conical cover attached to the upper end of said primary gas inlet conduit, a ring partition arranged in the feed chamber to provide a secondary gas plenum chamber, said partition defining a multiplicity of orifices spaced about the lower end of the lift conduit, conduit means for supplying secondary lift gas to the plenum chamber, and a downwardly facing ring type angle baffle attached to the ring partition, so as to provide a means for distributing secondary gas into a bed of contact material in the lift chamber, the lower end of the baffle being below the upper end of the primary gas inlet conduit.

5. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: a lift feed chamber located below one of said contacting chambers, conduit means for flow of contact material from said contacting chamber to the upper section of said feed chamber, a separation chamber having a gas outlet positioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a gas inlet conduit projected upwardly into said feeding chamber, being terminated near the bottom of the lift conduit, the gas inlet and lift conduits being substantially coaxial and means defining a plurality of vertically elongated passageways located across the cross-section of said gas inlet conduit, so as to split the gas stream into a plurality of laterally confined streams of gas, said passageways extending for a vertical distance sufficient to effect straightening of the gas flow.

6. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: a lift feed chamber located below one of said contacting chambers, conduit means for flow of contact material from said contacting chamber to the upper section of said feed chamber, a separation chamber having a gas outlet positioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a gas inlet conduit projected upwardly into said feeding chamber, being terminated near the bottom of the lift conduit, the gas inlet and lift conduits being substantially coaxial, means defining a plurality of vertically extending passageways, located uniformly across the horizontal cross-section of said gas inlet conduit, of sufficient length to effect directional control of the gas, means defining orifices positioned intermediate the ends of each passageway in said gas inlet conduit, so as to provide a substantial pressure drop in the gas passing through said passageways and a conical screen mounted atop the upper end of said gas inlet conduit and partially projected into the lower end of said lift pipe.

7. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: a lift feed chamber located below one of said contacting chambers, conduit means for flow of contact material from said contacting chamber to the upper section of said feed chamber, a separation chamber having a gas outlet near its upper end positioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a flared mouthpiece forming the lower end of said lift conduit having its downwardly facing lower end open to the feed chamber at a location above the bottom of the chamber, a gas inlet conduit projected upwardly into said feeding chamber, being terminated near the bottom of the lift conduit, the gas inlet and lift conduits being substantially coaxial, means defining a plurality of vertically extending passageways, located uniformly across the horizontal cross-section of said gas inlet conduit, of sufficient length to effect directional control of the gas flowing therethrough, orifice members positioned at the lower ends of said passageways, so as to provide a substantial and uniform pressure drop of the gas entering the passageways, the axes of the passageways being substantially parallel to the axis of the lift pipe, a perforated conical hood attached to the upper end of said gas inlet conduit, having an apex angle of about 60 degrees, said conical hood being projected upwardly into the lower end of said lift pipe, so as to define an annular passageway between the hood and flared mouthpiece of the lift pipe of substantially uniform thickness.

8. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: a lift feed chamber located below one of said contacting chambers, conduit means for flow of contact material from said contacting chamber to the upper section of said feed chamber, a separation chamber having a gas outlet near its upper end positioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a flared mouthpiece forming the lower end of said lift conduit having its downwardly facing lower end open to the feed chamber at a location above the bottom of the chamber, a gas inlet conduit projected upwardly into said feeding chamber, being terminated near the bottom of the lift conduit, the gas inlet and lift conduits being substantially coaxial, means defining a plurality of vertically extending passageways, located uniformly across the horizontal cross section of said gas inlet conduit, of sufficient length to effect directional control of the gas flowing therethrough, orifice members positioned at the lower ends of said passageways, so as to provide a substantial and uniform pressure drop of the gas entering the passageways, the axes of the passageways being substantially parallel to the axis of the lift pipe, a perforated conical hood attached to the upper end of said gas inlet conduit, having an apex angle of about 60 degrees, said conical hood being projected upwardly into the lower end of said lift pipe, so as to define an annular passageway between the hood and flared mouthpiece of the lift pipe of substantially uniform thickness, and a conical mesh screen, located beneath said perforated conical hood, the mesh of the screen being substantially smaller than the perforation of the hood.

9. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: a lift feed chamber located below one of said contacting chambers, conduit means for flow of contact material from said contacting chamber to the upper section of said feed chamber, a separation chamber having a gas outlet near its upper end positioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a flared mouthpiece forming the lower end of said lift conduit having its downwardly facing lower end open to the feed chamber at a location above the bottom of the chamber, a gas inlet conduit projected upwardly into said feeding chamber, being terminated near the bottom of the lift conduit, the gas inlet and lift conduits being substantially coaxial, a perforated conical hood attached to the upper end of said gas inlet conduit, having an apex angle in the neighborhood of 60 degrees, said conical hood being projected upwardly into the lower end of said lift pipe, so as to define an annular passageway between the hood and flared mouthpiece of the lift pipe of substantially uniform thickness, and a conical mesh screen, located beneath said perforated conical hood, the mesh of the screen being substantially smaller than the perforation of the hood.

References Cited in the file of this patent

UNITED STATES PATENTS

| | | |
|---|---|---|
| 1,319,193 | Von Porat | Oct. 21, 1919 |
| 1,364,532 | Von Porat | Jan. 4, 1921 |
| 1,827,727 | Blizard | Oct. 20, 1931 |
| 2,422,262 | Russell | June 17, 1947 |
| 2,425,098 | Kassel | Aug. 5, 1948 |
| 2,546,625 | Bergstrom | Nov. 27, 1951 |
| 2,625,442 | Kollgaard | Jan. 13, 1953 |
| 2,647,587 | Berg | Aug. 4, 1953 |